(12) United States Patent
Gleine et al.

(10) Patent No.: US 8,499,887 B2
(45) Date of Patent: Aug. 6, 2013

(54) ACOUSTICALLY OPTIMIZED CABIN WALL ELEMENT

(75) Inventors: Wolfgang Gleine, Kakenstorf (DE); Christian Thomas, Hamburg (DE)

(73) Assignee: Airbus Deutschland GmbH (DE)

( * ) Notice: Subject to any disclaimer, the term of this patent is extended or adjusted under 35 U.S.C. 154(b) by 3 days.

(21) Appl. No.: 12/417,695

(22) Filed: Apr. 3, 2009

(65) Prior Publication Data
US 2009/0250293 A1 Oct. 8, 2009

Related U.S. Application Data

(60) Provisional application No. 61/123,011, filed on Apr. 4, 2008.

(30) Foreign Application Priority Data

Apr. 4, 2008 (DE) .......................... 10 2008 017 357

(51) Int. Cl.
*E04B 1/82* (2006.01)

(52) U.S. Cl.
USPC ......................................... 181/292

(58) Field of Classification Search
USPC ................... 181/210, 290, 292, 293; 244/1 N
See application file for complete search history.

(56) References Cited

U.S. PATENT DOCUMENTS

| | | | | |
|---|---|---|---|---|
| 3,509,963 A | * | 5/1970 | Deplante ....................... | 181/207 |
| 3,822,762 A | * | 7/1974 | Crispin et al. ................. | 181/292 |
| 4,235,303 A | * | 11/1980 | Dhoore et al. ................. | 181/214 |
| 4,496,024 A | * | 1/1985 | Wolf et al. ..................... | 181/292 |
| 4,807,411 A | * | 2/1989 | Capaul ............................. | 52/144 |
| 5,414,232 A | * | 5/1995 | Wilson .......................... | 181/292 |

(Continued)

FOREIGN PATENT DOCUMENTS

| | | |
|---|---|---|
| DE | 1422020 | 11/1969 |
| DE | 3643481 | 11/1987 |
| DE | 3720371 | 1/1989 |

(Continued)

OTHER PUBLICATIONS

Wikipedia; Micro Perforated Plate; http://en.wikipedia.org/wiki/Micro_perforated_plate.*

*Primary Examiner* — Jeremy Luks
(74) *Attorney, Agent, or Firm* — Lerner, David, Littenberg, Krumholz & Mentlik, LLP

(57) ABSTRACT

A wall element for the sound-insulating interior lining of a transport device, comprising at least one sandwich element, at least one insulation package and at least one absorber plane element. The sandwich element comprises at least one core layer, a first cover layer and a second cover layer, wherein the first cover layer and the second cover layer are each arranged on one side of the core layer. At least the first or the second cover layer is a microperforated layer; the sandwich element possesses a shear rigidity that is adjusted in such a way that the sandwich element comprises one or several coincidence boundary frequencies that are determined by the shear rigidity, which coincidence boundary frequencies are outside the frequency range that dominates the noise in the interior of the cabin; and the shear rigidity of the sandwich element at the same time is sufficient for said sandwich element to be used as an interior lining. Sound-insulating interior lining according to the aspects according to the invention provides adequate sound insulation also in the lower frequency range of below 500 Hz, without increasing the weight of the interior lining when compared to the weight of conventional interior linings.

16 Claims, 2 Drawing Sheets

U.S. PATENT DOCUMENTS

| | | | |
|---|---|---|---|
| 5,664,397 A | 9/1997 | Holz | |
| 6,065,717 A * | 5/2000 | Boock | 244/1 N |
| 6,179,086 B1 * | 1/2001 | Bansemir et al. | 181/292 |
| 6,183,837 B1 * | 2/2001 | Kim | 428/118 |
| 6,267,838 B1 * | 7/2001 | Saugnac et al. | 156/320 |
| 2002/0157764 A1 * | 10/2002 | Andre et al. | 156/156 |
| 2006/0060421 A1 * | 3/2006 | Sarin et al. | 181/290 |
| 2007/0292658 A1 * | 12/2007 | Thomas et al. | 428/116 |
| 2008/0067002 A1 * | 3/2008 | Pfaffelhuber et al. | 181/290 |

FOREIGN PATENT DOCUMENTS

| | | |
|---|---|---|
| DE | 19509972 | 9/1996 |
| DE | 19804718 | 8/1999 |
| DE | 10034990 | 2/2002 |
| DE | 68909348 | 1/2004 |
| DE | 102005016653 | 10/2006 |
| DE | 102005016654 | 10/2006 |
| DE | 102005024549 | 12/2006 |
| WO | WO 2007137607 A1 * | 12/2007 |

* cited by examiner

ACOUSTICALLY OPTIMIZED CABIN WALL ELEMENT

CROSS-REFERENCE TO RELATED APPLICATIONS

This application claims the benefit of the filing date of U.S. Provisional Patent Application No. 61/123,011 filed Apr. 4, 2008, the disclosure of which application is hereby incorporated herein by reference.

The invention relates to a sandwich element for the sound-insulating interior lining of a transport means.

BACKGROUND OF THE INVENTION

Such sound-insulating interior linings increase the wellbeing of passengers traveling in the cabin of a transport means. In particular, cabins of commercial aircraft are exposed to a number of loud external noise sources, for example engine noise and noise of turbulent boundary-layer flow. The acoustic insulation of aircraft cabins using passive measures is confronted by new challenges as a result of the introduction of aircraft fuselages constructed from carbon-fibre reinforced plastic (CRP), because such fuselages, due to their lighter specific weight and greater rigidity, when compared to metal structures, are clearly more transparent to engine noise, in particular in the low-frequency range.

The essential requirements of acoustic insulation of aircraft cabins are: light weight; small volume; a high degree of sound insulation across the frequency range of the exciting sound sources; simple installation; simple production; low cost; and as far as possible the avoidance of using additional components. Up to now these requirements were met by standard cabin fittings and fitments which were modified with targeted passive measures to improve the acoustic characteristics. Such passive measures comprise, for example, the local reinforcement of glass wool insulation; the arrangement of open prepreg grids on the rear of cabin lining elements; the sealing of slits between lining elements; the elastic suspension of cabin fittings and fitments or cabin modules, for example crew rest compartments; and additional mass applied in a sheet-like manner.

Cabin fittings and fitments are widely produced in sandwich construction, comprising a honeycomb core and cover layers that are arranged on both sides of it, as is, for example, shown in DE 3720371. From more recent developments of cabin fittings and fitments, further-reaching and mass-neutral modifications of the sandwich construction are known, which modifications provide, for example, for the slitting of honeycomb cores in order to reduce sound radiation. However, mass-neutral measures share a common characteristic in that in the lower frequency range of the interfering sound sources only very slight improvements in the extent of the sound-insulation may be achieved.

An additional option to achieve reduced cabin noise levels consists of increasing the sound absorption. To this effect, prior art proposes, for example, the arrangement of microperforated absorption elements or absorbers in the form of small holes in the cover layer of cabin panels produced in sandwich construction, which with the enclosed air volume form a resonant system.

SUMMARY OF THE INVENTION

However, these measures by themselves do not achieve the desired good sound-reduction characteristics in particular in the frequency range below 500 Hz. Up to now only additional specific weight has been effective in this context, which weight has to be applied, in a sheet-like manner as mass, to the primary structure or to the cabin wall elements, and overall has resulted in significant and unacceptable additional weight of the overall cabin. There is a particular need for improved sound insulation in this frequency range if the fuselage is made from CRP, because a CRP fuselage, in particular in the low frequency range, generally below 500 Hz, has particularly poor sound-insulating characteristics in relation to engine noise. According to prior art, significant additional sheet-like mass would have to be applied to the aircraft wall in order to achieve good sound insulation.

A wall element according to the present invention, comprising the characteristics stated herein, provides for an improved efficiency of a cabin as a sound-reducing element of a transport means, in particular in relation to the lower frequency range below SOD Hz, without increasing the weight of the aircraft wall structure or the lining elements.

In the basic design of the sandwich element according to the invention two different measures for reducing the sound that acts on a cabin are combined. The sandwich element according to the invention comprises a core layer which preferably comprises a collection of honeycomb cells that are separated from each other by walls. In order to improve the rigidity of the core layer, on one side a first cover layer and on the other side a second cover layer are arranged, of which at least the first cover layer or the second cover layer comprises microperforation. Microperforation makes possible an acoustic interaction between the air that surrounds the sandwich element according to the invention and the hollow spaces of the honeycomb cells of the core layer so that as a first sound insulating measure sound may be absorbed.

Sound insulation may be still further improved by a second measure. It is well known that the shear rigidity of a (multi-layer) component has a significant effect on the acoustic radiation- and insulation characteristics of said component. An increase in shear rigidity results in a decrease in the sound insulation, and in increased sound radiation in the case of structure-borne sound excitation. In order to improve sound insulation, the sandwich element according to the invention could thus have a shear rigidity that is sufficiently low, while not be so low that it may no longer carry out the primary static tasks of the interior lining. Accordingly, the material characteristics of the sandwich element according to the invention are adjusted such that the sandwich element may carry out its mechanical function as an interior lining element, while nonetheless providing the maximum possible acoustic insulation effect combined with the lowest possible sound-radiation characteristics. At this position the improved acoustic characteristics are primarily defined by way of stating the coincidence boundary frequency, which depends on the shear rigidity. In contrast to homogeneous wall structures, in the case of sandwich elements in the region of the coincidence boundary frequency a drop in the extent of sound insulation occurs in the form of a broadband plateau. In this frequency range the propagation speeds of the transverse waves within the sandwich element predominate. It may be the objective to select a suitable shear rigidity of the sandwich element for shifting the coincidence boundary frequency to outside the frequency range that dominates the cabin noise.

Preferably, the sandwich element according to the invention comprises a microperforated cover foil or film, at least on one side, which cover foil or film comprises perforation holes with a diameter of max. 1 mm, or in an advantageous improvement of max. 0.5 mm, which perforation holes make it possible to achieve an improved sound absorption effect.

For further improvement, intermediate layers located within the core layer, either as stiff, panel-shaped components or as elastic components, may additionally be arranged in the sandwich element according to the invention.

In a further advantageous embodiment of the invention, the acoustic absorption of a cabin wall may be further improved by integrated wall elements, comprising a lining element and glass wool layers with microperforated absorber areas. Such an arrangement could be designed as a compact single-part element in which an insulation packet is located between the sandwich element according to the invention and a microperforated film or foil.

In a further embodiment of the invention, a multilayer design with glass wool layers and microperforated absorber areas that are situated in between may be used in order to further improve the acoustic absorption capacity of the cabin wall that is lined with sandwich elements according to the invention. Thus as a result of the multilayer design of different glass wool layers and the microperforated absorber areas situated in between, jumps in impedance between the individual layers occur. This results in multiple reflection, transmission and absorption of the sound waves that enter from the outside, wherein a clear improvement in sound insulation takes place.

Further advantageous embodiments are also disclosed.

BRIEF DESCRIPTION OF THE DRAWINGS

Below, the invention is explained in more detail with reference to figures. In the figures, identical objects have the same reference characters. The following are shown.

DETAILED DESCRIPTION

Figure 1:
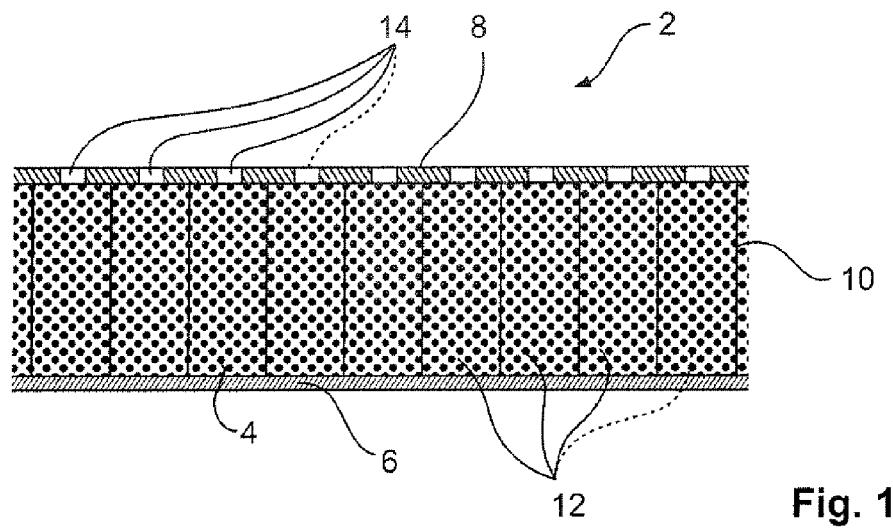
FIG. 1: a first exemplary embodiment of a sandwich element according to the invention.

FIG. 1 shows a simple basic design of the sandwich element 2 according to the invention, which sandwich element 2 comprises a honeycomb core 4, a bottom cover layer 6 and a top cover layer 8. In this example the core layer 4 is designed as a honeycomb structure, which for improved sound absorption could additionally comprise sound-absorbent material. This material could, for example, be open-pore or open-cell material, e.g. glass wool or foam material that has been placed between the walls 10 of the individual honeycomb cells 12, wherein the glass wool may, for example, have been placed into the honeycomb 12, either pressed in the form of a non-woven glass fabric with a high binding-agent content, or non-pressed.

The material of the walls 10 of the honeycomb cells 12 could be made from an aramide fibre material, in particular a meta-aramide material; a semi-finished product that is also known by the name of "Nomex® paper". Such a honeycomb structure by itself does not provide adequate mechanical strength, and thus achieves adequate stability only as a result of the applied cover layers 6 and 8. Usually, the bottom cover layer 6 is preferably made from a fibre-reinforced plastic, for example glass-fibre reinforced plastic or carbon-fibre reinforced plastic with a woven glass-fibre material or a woven carbon-fibre material embedded in a phenolic resin or the like. Provided other fibrous materials, non-fibrous plastics or the like appear to be suitable for providing adequate strength, they may also be used to produce the sandwich element 2 according to the invention. The top cover layer 8 is special in that it comprises microperforation with pores 14 that are regularly or irregularly distributed. The pores 14 make possible a pneumatic connection for acoustic interaction between the air surrounding the sandwich element according to the invention and the volumes of the individual honeycomb cells of the core layer for providing sound absorption. The diameter of the pores 14 is preferably 1 mm or less; preferably 0.5 mm or less is also selected as a pore diameter. If there are enough pores 14 on the surface of the sandwich element 2 according to the invention, the microperforation provides an adequate absorption effect, and as a result of the small hole diameter also prevents clogging of the honeycomb cells 12. Approximately 10% perforation is a suitable percentage of perforated area relative to the overall surface of the sandwich element. However, preferably the percentage of perforated area is less than 1% of the total surface.

The sandwich element 2 that is formed from the three layers 4, 6 and 8 comprises different determinable mechanical parameters such as, for example, shear rigidity. In order to provide the mechanical lining functions as a lining element, the sandwich element 2 according to the invention needs to comprise a minimum strength that also manifests itself in a minimum shear rigidity. Furthermore, acoustic parameters also depend on the mechanical characteristics of the sandwich element 2 according to the invention so that higher shear rigidity also results in higher sound radiation and lower sound insulation. Therefore the shear rigidity of the sandwich element according to the invention has to be selected such that the lowest possible sound radiation occurs at the highest possible sound insulation, wherein at the same time sufficient rigidity for mechanical lining of the cabin must be ensured. Thus, apart from the microperforated surface on at least one outside surface, it is the compromise between the mechanical rigidity and the advantageous sound characteristics that is the special feature of the sandwich element according to the invention.

Figure 2:
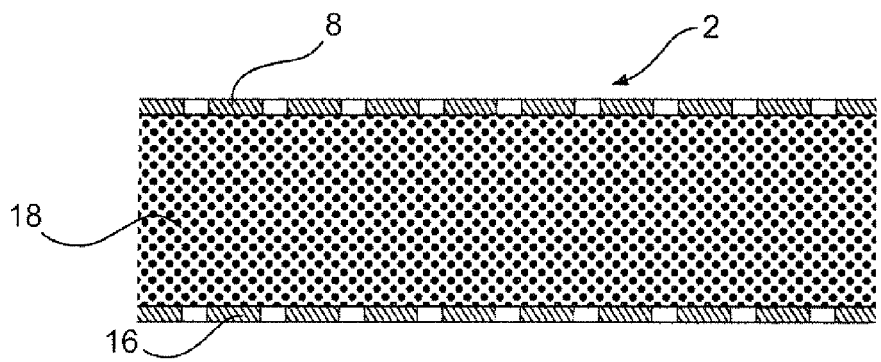
FIG. 2: a second exemplary embodiment of the sandwich element according to the invention.

FIG. 2 shows a second proposed exemplary embodiment of the sandwich element 2 according to the invention, which sandwich element 2, instead of comprising a closed bottom cover layer 6 comprises a second microperforated cover layer 16. A core layer 18 of the sandwich element 2 according to the invention is thus on both sides pneumatically connected to the surroundings. The second microperforated cover layer 16 could comprise identical pores 14 with an identical distribution on the surface, as is the case in the top microperforated cover layer 8, although this is not mandatory. Since the second microperforated cover layer possibly faces the interior of the cabin, the microperforation may also be covered by an air-permeable textile layer, or may in some other manner meet more stringent visual and haptic requirements. Between the two cover layers 8 and 16 there is the sound-absorbent core layer 18, which does not necessarily have to be a honeycomb core but could instead be constructed from a suitable foam material. In this exemplary embodiment, too, in order to optimise the overall characteristics it is necessary to select the material characteristics, and in particular the shear rigidity, so that the lowest possible sound radiation effects, the highest possible sound insulation, and at the same time sufficient mechanical rigidity may be ensured.

Figure 3:
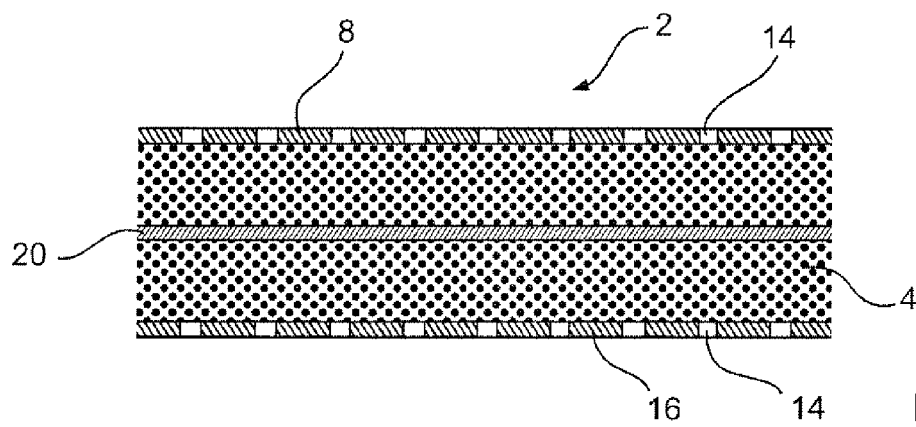
FIG. 3: a third exemplary embodiment of the sandwich element according to the invention.

FIG. 3 shows a further modification of the inventive sandwich element 2 shown in the preceding figures. It is a sound-absorbent, flat, and essentially dimensionally stable intermediate layer 20, arranged in the core layer 4, which intermediate layer may, for example, be made from a fibre-reinforced plastic, which intermediate layer 20 is the special feature of this third exemplary embodiment. The additional intermediate layer 20 further improves the sound insulation and could thus compensate for any inadequate sound insulation effect resulting from the perforation of both cover layers.

Figure 4:
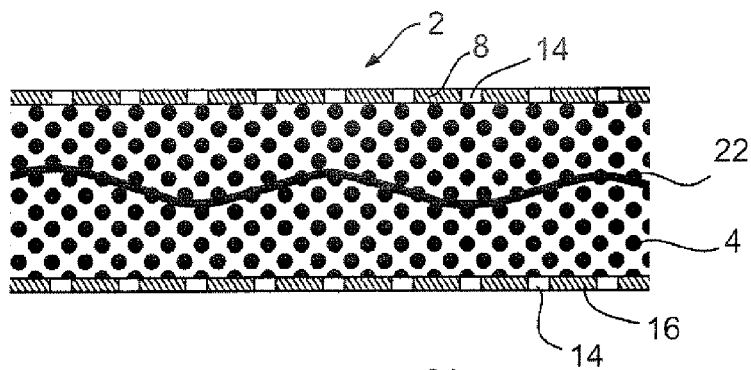
FIG. 4: a fourth exemplary embodiment of the sandwich element according to the invention.

A proposed modification of such a sandwich element 2 according to the invention according to the third exemplary embodiment of FIG. 3 is shown in FIG. 4, in which modification there is also an intermediate layer 22 arranged within the core layer 4 of the sandwich element 2, wherein the intermediate layer 22 is, however, not dimensionally stable but instead elastic. For example silicon or some other rubber-like material may be considered for this. This intermediate layer 22 does not increase the entire total rigidity of the sandwich element 2, but instead only contributes to an improvement in the sound-insulating characteristics.

Figure 5:
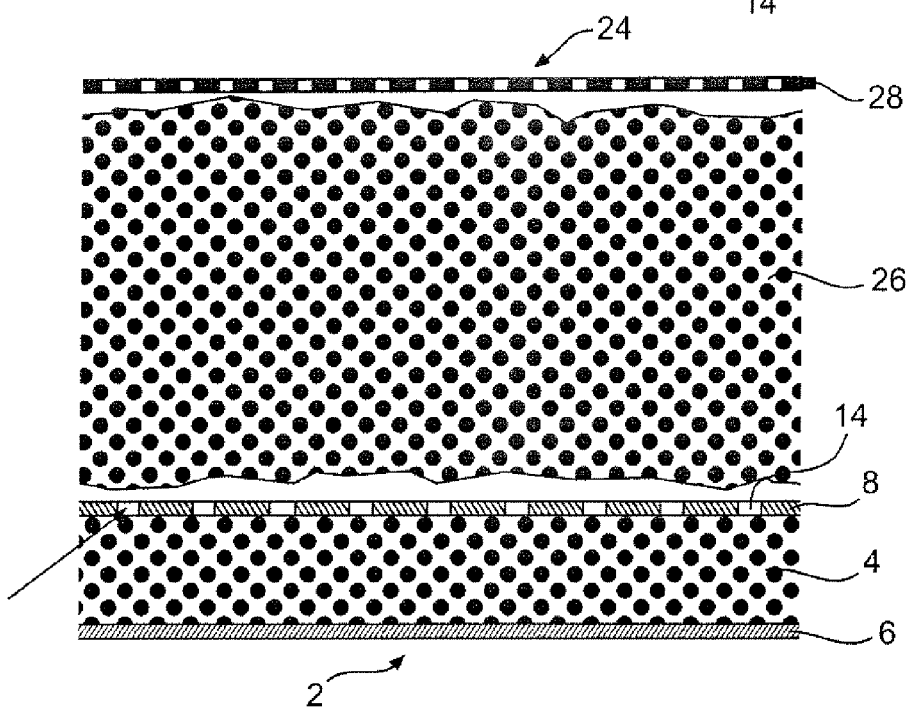
FIG. 5: a multilayer design comprising a sandwich element according to the invention and insulation.

In certain regions of the cabin wall, for example in a side-wall, an integrated wall element 24 that comprises a sandwich element 2 according to the invention, one or several glass wool layers 26 as insulation package, with microperforated absorber plane element 28 according to FIG. 5, which absorber plane element 28 are, for example, in the form of thin film or foil, may be used in a cabin of a vehicle. This arrangement is used to further improve sound absorption towards the fuselage.

Figure 6:
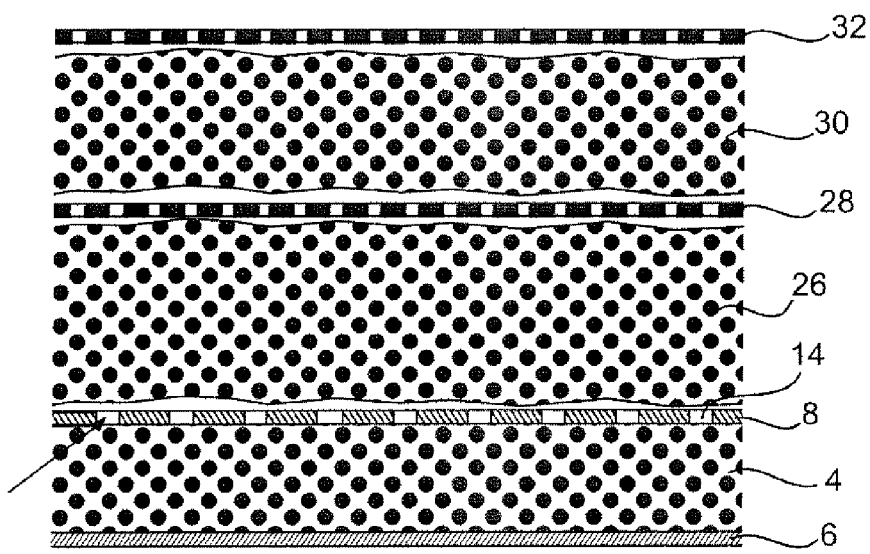
FIG. 6: a further multilayer design comprising a sandwich element according to the invention and insulation.

FIG. 6 shows a modification of the integrated wall element 24, in which an additional insulation package 30 and an additional microperforated film or foil 32 are arranged on the outside on the microperforated film or foil 28 or on the insulation package 26. This results in a further increase in the sound absorption, while at the same time the shear rigidity of the sandwich element 2 according to the invention is maintained, and without there being any need to affix in a sheet-like manner any additional mass to the interior wall of the cabin.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments may also be used in combination with other characteristics or steps of other exemplary embodiments described above. Reference characters in the claims are not to be interpreted as limitations.

LIST OF REFERENCE CHARACTERS

2 Sandwich element
4 Honeycomb core layer
6 Bottom cover layer (closed)
8 Top cover layer (microperforated)
10 Honeycomb wall
12 Honeycomb/honeycomb cell
14 Pore
16 Bottom cover layer (microperforated)
18 Foam core layer
20 Sound-insulating intermediate layer (dimensionally stable)
22 Sound-insulating intermediate layer (elastic)
24 Wall element
26 Insulation package
28 Absorber plane element (microperforated)
30 Insulation package
32 Absorber (microperforated)

The invention claimed is:

1. A wall element for a cabin, comprising:
   at least one sandwich element,
   at least one insulation package, and
   at least one microperforated absorber plane element that, on the outside, follows on from the insulation package;
   wherein the sandwich element comprises at least one core layer, a first cover layer and a second cover layer, with the first cover layer and the second cover layer each being arranged on one side of the core layer and wherein at least the first or the second cover layer is a microperforated layer;
   wherein the sandwich element is configured for sound absorption; and
   wherein the sandwich element is further configured to possess a shear rigidity configured to exhibit at least one coincidence boundary frequency determined by the shear rigidity, wherein at least one of the at least one coincidence boundary frequency is below 500 Hz; and
   wherein the shear rigidity of the sandwich element is sufficient for said sandwich element to be used as an interior lining.

2. The wall element of claim 1,
   wherein the at least one coincidence boundary frequency of the sandwich element is outside the frequency range that dominates the ability to understand language.

3. The wall element of claim 1,
   wherein the core layer comprises a multitude of tubular or honeycomb-like cells which extend through the thickness of the core layer so that they are open right through, and which are separated from each other by cell walls and are also of uniform appearance.

4. The wall element of claim 3,
   wherein the cells are constructed in the manner of a honeycomb.

5. The wall element of claim 3,
   wherein the cells are filled with a sound-absorbent material.

6. The wall element of claim 1,
   wherein the core layer comprises a porous material selected from the group consisting of a foam material, a pressed glass wool material and a non-pressed glass wool material.

7. The wall element of claim 1,
   wherein the diameter of the pores of the microperforated layer is at most 1 mm.

8. The wall element of claim 1,
   wherein the diameter of the pores of the microperforated layer is at most 0.5 mm.

9. The wall element of claim 1,
   wherein the percentage of perforated area of the pores on the surface of the first or the second cover layer is 10% or less.

10. The wall element of claim 1,
    wherein the percentage of perforated area of the pores on the surface of the first or the second cover layer is 1% or less.

11. The wall element of claim 1,
    wherein the sandwich element further comprises at least one intermediate layer arranged between the first and the second cover layer.

12. The wall element of claim 11,
    wherein the intermediate layer is dimensionally stable.

13. The wall element of claim 11,
    wherein the intermediate layer is elastic.

14. The wall element of claim 1,
wherein the first cover layer is a microperforated layer arranged on a side of the sandwich element facing a fuselage wall of the cabin;
wherein the insulation package is arranged between the first cover layer and the microperforated absorber plane element.

15. An interior lining of an aircraft, comprising at least one wall element, the at least one wall element comprising:
at least one sandwich element,
at least one insulation package and
at least one microperforated absorber plane element that, on the outside, follows on from the insulation package;
wherein the sandwich element comprises at least one core layer, a first cover layer and a second cover layer, with the first cover layer and the second cover layer each being arranged on one side of the core layer and wherein at least the first or the second cover layer is a microperforated layer; and
wherein the sandwich element is configured to possess a shear rigidity configured to exhibit at least one coincidence boundary frequency determined by the shear rigidity, wherein at least one of the at least one coincidence boundary frequency is below 500 Hz; and
wherein the shear rigidity of the sandwich element is sufficient for said sandwich element to be used as an interior lining.

16. An aircraft comprising an interior lining made from at least one wall element, the at least one wall element comprising:
at least one sandwich element,
at least one insulation package and
at least one microperforated absorber plane element that, on the outside, follows on from the insulation package;
wherein the sandwich element comprises at least one core layer, a first cover layer and a second cover layer, with the first cover layer and the second cover layer each being arranged on one side of the core layer and wherein at least the first or the second cover layer is a microperforated layer; and
wherein the sandwich element is configured to possess a shear rigidity configured to exhibit at least one coincidence boundary frequency determined by the shear rigidity, wherein at least one of the at least one coincidence boundary frequency is below 500 Hz; and
wherein the shear rigidity of the sandwich element is sufficient for said sandwich element to be used as an interior lining.

* * * * *